United States Patent
Steklenski

(10) Patent No.: US 6,787,107 B2
(45) Date of Patent: Sep. 7, 2004

(54) ELEMENT WITH COATED DOSIMETER

(75) Inventor: David J. Steklenski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 299 days.

(21) Appl. No.: 09/995,080

(22) Filed: Nov. 27, 2001

(65) Prior Publication Data

US 2003/0099571 A1 May 29, 2003

(51) Int. Cl.$^7$ .............................................. G01N 21/00
(52) U.S. Cl. .................... 422/56; 422/156; 422/58; 422/57; 422/159; 422/82.05; 436/169; 436/58; 436/57
(58) Field of Search ................. 422/56, 156, 58, 422/57, 159, 82.05, 22, 50; 436/169, 58, 57; 235/487; 250/474.1, 515.1

(56) References Cited

U.S. PATENT DOCUMENTS

| | | | |
|---|---|---|---|
| 4,146,782 A | | 3/1979 | Barnich |
| 4,542,528 A | | 9/1985 | Sanner et al. |
| 4,578,571 A | | 3/1986 | Williams |
| 4,668,714 A | | 5/1987 | Morita et al. |
| 5,066,863 A | * | 11/1991 | Hanisch et al. .......... 250/474.1 |
| 5,364,593 A | | 11/1994 | Mihaylov et al. |
| 5,637,876 A | | 6/1997 | Donahue et al. |
| 5,767,520 A | | 6/1998 | Donahue et al. |
| 5,777,341 A | | 7/1998 | Seiwatz et al. |
| 5,910,847 A | | 6/1999 | VanderWerf et al. |
| 6,268,602 B1 | | 7/2001 | Seiwatz et al. |
| 6,284,198 B1 | | 9/2001 | Kirollos et al. |
| 6,398,710 B1 | | 6/2002 | Ishikawa et al. |
| 6,563,565 B2 | | 5/2003 | Nishi |
| 2003/0080303 A1 | * | 5/2003 | Hayashi et al. .......... 250/515.1 |
| 2003/0098354 A1 | * | 5/2003 | Steklenski et al. .......... 235/487 |

FOREIGN PATENT DOCUMENTS

| | | |
|---|---|---|
| DE | 196 37 471 A | 3/1997 |
| EP | 0389113 | 9/1990 |
| JP | 61057878 A | 3/1986 |
| JP | 01025085 | 1/1989 |
| JP | 01046677 A | 2/1989 |
| JP | 401080895 * | 3/1989 |
| JP | 01102388 A | 4/1989 |
| WO | WO 9900677 | 1/1999 |

OTHER PUBLICATIONS

T. Kojima et al., "Alanine Dosimeters Using Polymers as Binders", Applied Radiation & Isotopes, vol. 37, No. 6, (1986), Pergarnon Journals Ltd., pp. 517–520.

* cited by examiner

*Primary Examiner*—Jill Warden
*Assistant Examiner*—Sam P. Siefke
(74) *Attorney, Agent, or Firm*—Kathleen Neuner Manne

(57) ABSTRACT

An element for ascertaining radiation dosage comprising: a support on which is disposed a coated layer, said coated layer comprising a binder and alanine; wherein the alanine, upon exposure to ionizing radiation, produces radicals that remain stable for long periods.

28 Claims, No Drawings

ELEMENT WITH COATED DOSIMETER

FIELD OF THE INVENTION

The invention relates to a coated element that provides accurate and simple measurement of doses of local ionizing radiation in a prescribed area of interest. The element (or dosimeter) comprises a plastic support on which is disposed a layer coated from a solution in which alanine is uniformly dispersed in a solvent-soluble elastomeric binder.

BACKGROUND OF THE INVENTION

There are various processes that utilize radiation—e.g., sterilization, radiation therapy, food irradiation, quality checking, etc.—and these processes have a need to verify the radiation dose. Similarly, there is a large number of different methods to determine a dose—e.g., ion dosimetry (ionization in air), calorimetry (determination of heat in carbon or metals), thermoluminescence dosimetry (luminescence in solids), etc. The formation of radicals in solid organic substances on irradiation has been observed and the concentration of these radicals is proportional to the absorbed dose over a wide range. The concentration of the radicals can be determined easily by means of electron paramagnetic resonance (EPR) spectroscopy. Alanine has been widely used for this purpose due to its availability and the relative simplicity of incorporating it into practical dosimeters. An advantage of the use of organic materials such as alanine over inorganic dosimeter systems is that it can be assumed that the irradiation-induced changes in organic materials are closer to radiation effects in living tissues.

Alanine dosimetry is an accepted method to determine the radiation dose of different irradiation processes. On irradiating with ionizing radiation, radicals will be produced in alanine which are stable for long periods. This is mainly due to the inhibition of radical—radical recombinations in the crystalline structure of the material that prevents the migration of large molecule fragments. The non-destructive evaluation of the radical concentration can be done using EPR spectroscopy. The determination of irradiation doses by means of EPR techniques requires a sensitive, robust and reliable instrument that can be served by a laboratory worker. A useful instrument provides such features as automated procedures for calibration and measurements. Careful adjustment of the EPR spectrometer and the selection of suitable dosimeters allows the determination of dose rates in a range from 2 Gy to 200 kGy with a total uncertainty of 3.5% (confidence level of 95%). Alanine dosimeters are small, stable, and easy to handle. They are characterized by their large measuring range and a low sensitivity to temperature and humidity. This allows for their application in radiation therapy, the irradiation of blood, as well as in industrial facilities for irradiation. The dosimeter system can be used for reference and routine dosimetry due to its high quality and low costs.

Alanine dosimeters are well known in the art. For example, in the reference: T. Kojima et al., "Alanine Dosimeters Using Polymers As Binders", Applied Radiation & Isotopes, vol. 37, No. 6, (1986), Pergamon Journals Ltd., pp. 517–520, there are numerous references to dosimeters made in pellet, rod, and film formats. Dosimeters have been made both by industrial laboratories and at academic institutions. Many of these dosimeters are in the form of molded pellets or rods. The alanine is generally blended with a synthetic or natural rubber, compounded and molded under pressure to form a variety of shapes (U.S. Pat. No. 4,668,714, J.P. 203276 J.P. 0125085, J61057-878-8). There are also references in the literature to extruded films (J01102-388-A). These extruded products, while working well, have several deficiencies. Their manufacture often requires the use of high pressures and temperatures during the molding process, requiring molding equipment that limits the sizes and shapes available. Molded dosimeters are also limited in that only moldable polymeric binders may be used. The use of molded dosimeters is also somewhat restrictive, as the size of the dosimeters tends to be very small, leading to difficulties in handling and possibly loss during irradiation.

A potential solution to these difficulties would be an alanine dosimeter coated onto a flexible support wherein the support serves not only to hold the alanine, but also provides the user with a length and width that allow easy handling. Such a coated dosimeter has been described in DE19637471 A. In this art, the alanine is coated from two, specific binders—a polyoctenamer or polystyrene. Both of these binders are brittle materials and make the coating of thick alanine layers with good mechanical properties very difficult, especially when the thickness of the dosimeter layer is >100 microns. The ability to bend and shape the alanine dosimeter coated on to the plastic support can be very important in some applications, and is a significant limitation of the coated dosimeters described in the art.

It would be useful in the industry to have a dosimeter that is flexible and preferably made of material that is not brittle.

SUMMARY OF THE INVENTION

The present invention discloses an element that functions as a dosimeter, the element comprised of a thin alanine containing layer coated on a flexible plastic support. The alanine is uniformly dispersed in a solvent-soluble binder to form a coating solution and the solution used to coat a support. Hence the invention describes an element for ascertaining radiation dosage comprising: a support on which is disposed a coated layer, said coated layer comprising a binder and alanine; wherein the alanine, upon exposure to ionizing radiation, produces radicals that remain stable for long periods of time.

The present invention offers several advantages. The support is flexible and durable; avoiding the brittleness known in the prior art. The coating processes used afford the manufacturer greater control and therefore greater uniformity in the alanine content. The element can be easily handled and easily manufactured in large volume.

DETAILED DESCRIPTION OF THE INVENTION

Important to the manufacture of practical, coated, alanine dosimeters is the selection of binder materials that allow the coating of high fractions of alanine in the layer, and yet are flexible enough to allow the alanine layer to bend without cracking or breaking when coated at thickness >100 micron. Binders such as the polystyrene, mentioned in the previous art, are too brittle to allow a coating of the thick layers required. Far better are elastomeric binders that have high coefficients of elasticity and bond well both to plastic substrates and the alanine. Examples of such binders include solvent soluble polyesters, vinyl elastomers such as ethylene-vinylacetate copolymers, alkyl methacrylates and acrylates(propyl and above), and polyurethanes. The polyurethane binders are especially preferred for their excellent solvent solubility and high-level of adhesion to many plastic supports. Particularly preferred are aromatic polyurethanes represented by Estane™ 5715 (B. F. Goodrich Inc) and aliphatic polyurethanes represented by Permuthane™ U6366 (Stahl Inc.). A key element in the choice of a binder is that the binder must not form free radicals that would interfere with the alanine signal upon exposure to ionizing radiation.

The binder is present at between 10 and 80 wt. % of the final layer. Most preferably the binder is present at between 35 and 50 wt. % of the final layer so as to provide optimum flexibility while still allowing a high coverage of the alanine to be applied.

The support for the present alanine dosimeter may be any one of a number of plastic supports such as polyethylene film, polyamide film, polyimide film, polypropylene film, polycarbonates, cellulosic supports, and polyester supports and the like, ordinary paper, and processed paper such as photographic paper, printing paper such as coated paper and art paper, baryta paper, and resin-coated paper. The support should be able to wrap around a rod of 0.1875"–0.25" diameter without showing signs of cracking, crazing or other damage. The support should also be resistant to the effects of coating solvents and normal ambient conditions. The preferred support is oriented polyester with a thickness of 2–14 mil. Most preferably, the polyester support would be within the range of 6–10 mil to provide reasonable stiffness for ease of handling while retaining the desired degree of flexibility for applications where bending of the dosimeter is required. The polyester would be clear in the preferred use, but white (pigmented with $TiO_2$ or $BaSO_4$) supports are also useful. A primary requirement of the pigment or tinting material is that it must not interfere with the signals generated by the alanine. In the preferred embodiment, the support is clear (non-pigmented and undyed). The support preferably contains an adhesion promoting sub layer to improve substrate wetting and the adhesion of the alanine layer.

Alanine is useful because, on irradiation with ionizing radiation, it produces radicals in proportion to the radiation dose received and the radicals produced remain stable for a period of at least several hours so that the radical concentration can be read. For the purposes of the present invention, alanine is preferred and should be in the L-alanine form. The crystalline material should have a particle size in the range of 0.1–200 microns before coating. In order to form the alanine layer, crystals of L-alanine are dispersed in solvent along with the binder. In general, the alanine crystals are too large to be coated as they are received from the manufacturer and must be ground to smaller size. The particle size reduction can be accomplished by any standard method. Examples of such methods are dry grinding by means of a ball mill or attritor, wet milling by means of a media mill, rod milling, and hammer milling. Other methods such as precipitation, spray drying, and recrystallization are also useful. It is preferred that the alanine particles are less than 100 microns in size. It is particularly preferred that the alanine particles range between 1 and 40 microns in size.

Solvents for the dispersion may be any solvent that dissolves the binder, but solvents that evaporate quickly such as ketones(acetone, methylethyl ketone), alcohols (methanol, ethanol), acetates (methylacetate) and chlorinated solvents such as methylene chloride are preferred. Acetone, methylene chloride and mixtures of methylene chloride and methanol are particularly preferred.

Various addenda may be added to the alanine/binder mixture. Amorphous silica or alumina may be added in amounts from 0.1 to 5% of the weight of the alanine to improve particle flow characteristics. Preferably silica is the flow additive and is added at levels from 0.25–1% by weight of the alanine. Surfactants may also be added in amounts from 0.01–1% weight % of the total dispersion as coating and leveling aids. Preferred coating aids are the silicone additives typified by DC1248 manufactured by Dow Corning Inc.

Coating of the alanine-containing layer can be done by common coating methods such as dip coating, roll coating, and extrusion hopper coating. The alanine dispersion may be coated over the entire width/length of the support/dosimeter or over only a portion. Particularly preferred for application of the alanine-containing dispersion to the support is the use of extrusion hopper coating. This type of coating is well known to be able to lay down precise amounts of dispersion resulting in reproducible coverages. After the dispersion is applied to the support, the coated layer is dried. Initial drying is done at relatively low temperatures, such as from 20–35° C. with restricted airflow to prevent the occurrence of drying defects such as cells, cracks, orange peel, and the like. The initial drying is followed by a second warming step at higher temperatures, from 50–120° C. where the layer is cured and the final amounts of solvent removed from the coating. The desired coating thickness is dependent on the radiation level that is to be detected with thicker layers required to detect lower doses. The thickness of the alanine layers of this invention can be from 10–300 microns. The preferred thickness is between 100 and 200 microns and most preferably between 125 and 175 microns where an excellent compromise between detectability and handling characteristics is obtained.

The alanine-containing layer is robust as formulated, however there may be occasions where a protective overcoat may be desirable. Such an overcoat would provide resistance to exposure to contamination and could serve to protect the dosimeter from exposure to excessive moisture. As in the case of the binder for the alanine-containing layer, a primary requirement of the overcoat layer is that it must not generate free radicals upon irradiation whose EPR signal interferes with that of the alanine. Typical overcoat polymers would possibly include acrylates, methacrylates, cellulosics such as cellulose acetate, polyesters, polyurethanes, and halogen-containing polymers and copolymers. The overcoat formulation will depend on the binder used for the alanine layer and must be such that the alanine layer is not significantly disturbed by its application.

EXAMPLES

Examples of the Invention

1. Preparation of the Alanine Dispersion 224 grams of Estane™ 5715 were added to 1296 grams of methylene chloride and 144 grams of methanol and stirred until polymer was completely dissolved. To the polymer solution was added to 336 grams of L-alanine (Kyowa Hakko Inc.) and 1.0 grams of a silicone-based coating aid (DC1248, Dow Corning Inc.). The resulting dispersion was passed through a media mill containing three mil glass beads at a loading of 70% of the empty volume of the chamber. The rate at which the dispersion was passed through the mill was determined by measuring the particle size of the initial output from the mill and adjusting mill parameters to give the desired particle size distribution. The median particle size of the final dispersion was about 25 microns. The solids content of the dispersion was adjusted to between 25 and 30 percent to provide a coating viscosity of 500–1000 cps.

2. Coating of the Alanine Dispersion

The alanine dispersion prepared above was applied to the support by means of an extrusion hopper fed by a gear pump. The pumping rate was adjusted to give a coating thickness of about 130 microns. The coated alanine layer was dried in the coating machine through the use of forced warm air drying. Drying was done in stages with the initial drying being at lower temperatures, 25–35° C., and reduced airflow, and the final drying being at 80–100° C. The support with its coated alanine layer was then wound in a roll.

3. Finishing of the Alanine Dosimeter Strips

The support coated in Step 3 above was mounted on to a precision chopping device. The support was fed through the guillotine blade of the chopper and strips of 4 mm width produced.

Comparative Example 1

Strips of the clear, 7 mil polyester support used above were cut to the same size as the dosimeters of the invention to demonstrate that the substrate did not provide signals which would distract from the signal obtained from the alanine.

Comparative Example 2

A solution of 15 gms of Estane™ 5715 were added to 76.5 grams of methylene chloride and 8.5 grams of methanol and stirred until polymer was completely dissolved. The polymer solution was coated onto the clear, 7 mil polyester support used above using a draw knife with a gap of 10 mils. The resulting coating was air dried at ambient conditions and then finally dried in a forced air oven at 65° C. Strips of the coated polyester support were cut to the same size as the dosimeters of the invention to demonstrate that the combination of the substrate and Estane binder did not provide signals which would distract from the signal obtained from the alanine.

Comparative Example 3

A molded alanine pellet was obtained from Gamma Service Produktbestrahlung GmbH to show that the signal obtained from the dosimeter of the invention were comparable to those existing in the art.

Testing of the Alanine Dosimeter Strips

A. EPR Signal

The dosimeter strips and alanine dosimeter pellet were irradiated to a level of 20 kGy using a cobalt$_{60}$ radiation source. After irradiation, the dosimeter strips comparative examples were examined using an EPR spectrometer (Bruker Biospin™). The signal results are shown in Table 1.

| Example | EPR Signal |
|---|---|
| Comparative Example 1 | None |
| Comparative Example 2 | None |
| Comparative Example 3 | $1.85 \times 10^3$ |
| Invention Example 1 | $4.21 \times 10^3$ |

The test result shows that the dosimeter of the invention is suitable for detecting radiation when compared to those existing in commerce and that the materials used to prepare the dosimeter do not interfere with the signal generated by the alanine.

B. Flexibility Test

Alanine dosimeters of Example 1 were wrapped around a series of rods of decreasing diameters to demonstrate flexibility. Dosimeters were wrapped with the coated side facing the rod and with the coated side away from the rod. After wrapping, the dosimeters were unwrapped and examined for cracking, crazing, or other signs of damage. Rod diameters of 1", 0.5", 0.375" and 0.25" were used and none of the invention dosimeters showed any signs of damage.

The invention has been described in detail with particular reference to certain preferred embodiments thereof, but it will be understood that variations and modifications can be effected within the spirit and scope of the invention.

What is claimed is:

1. An element for ascertaining radiation dosage comprising:
   a support on which is disposed a coated layer, said coated layer comprising a binder, alanine, and an additive, wherein the additive includes amorphous silica, alumina, a surfactant, or a combination thereof; and
   wherein the alanine, upon exposure to ionizing radiation, produces radicals that remain stable for long periods of time.

2. The element of claim 1 wherein the alanine is in crystalline form.

3. The element of claim 1 wherein a surface of the support is entirely or partially covered by the coated layer.

4. The element of claim 1 wherein the support is flexible.

5. The element of claim 1 wherein the support is a polyethylene film, a polyamide film, a polyimide film, a polypropylene film, a polycarbonate, a cellulosic support, or a polyester support.

6. The element of claim 1 wherein the support is ordinary paper, processed paper, coated paper, art paper, baryta paper, or resin-coated paper.

7. The element of claim 1 wherein the support is between 2 and 14 mils. in thickness.

8. The element of claim 1 wherein the support is between 6 and 10 mils. in thickness.

9. The element of claim 1 wherein the support is clear polyester.

10. The element of claim 1 wherein at least one side of the support has an adhesion promoting layer.

11. The element of claim 2 wherein the crystalline alanine comprises particles less than 100 microns in size.

12. The element of claim 2 wherein the crystalline alanine comprises particles between 1 and 40 microns in size.

13. The element of claim 1 wherein the binder is an elastomeric binder with a high coefficient of elasticity.

14. The element of claim 1 wherein the binder is a solvent soluble polyester, a vinyl elastomer, or a polyurethane.

15. The element of claim 1 wherein the binder is an ethylene-vinylacetate copolymer, an alkyl methacrylate or an acrylates with more than 3 carbon atoms.

16. The element of claim 1 wherein the binder is an aromatic polyurethane or an aliphatic polyurethane.

17. The element of claim 1 wherein the binder is between 10 and 80 weight percent of the final layer.

18. The element of claim 1 wherein the binder is between 35 and 50 weight percent of the final layer.

19. The element of claim 1 wherein the additive comprises amorphous silica or alumina, and the additive is present in amounts from 0.1 to 5% of the weight of the alanine.

20. The element of claim 1 wherein the additive is silica at levels from 0.25–1% by weight of the alanine.

21. The element of claim 1 wherein the additive is a surfactant.

22. The element of claim 21 wherein the surfactant is present in amounts from 0.01–1% weight % of the alanine-containing dispersion.

23. The element of claim 1 wherein the coated layer is between 100 and 200 microns thick.

24. The element of claim 1 wherein the coated layer is between 125 and 175 microns thick.

25. The element of claim 1 further comprising a protective overcoat.

26. A coating solution comprising a solvent carrying alanine particles, binder, and an additive, said solution being used to coat substrate to produce a dosimeter for ascertaining local ionizing radiation, wherein the additive includes a surfactant, amorphous silica, alumina, or a combination thereof.

27. The coating solution of claim 26 wherein the solvent is a ketone, an alcohol, an acetate, or a chlorinated solvent.

28. The coating solution of claim 26 wherein the solvent is acetone, methylene chloride, or mixtures of methylene chloride and methanol.

* * * * *